United States Patent Office 3,317,789
Patented May 2, 1967

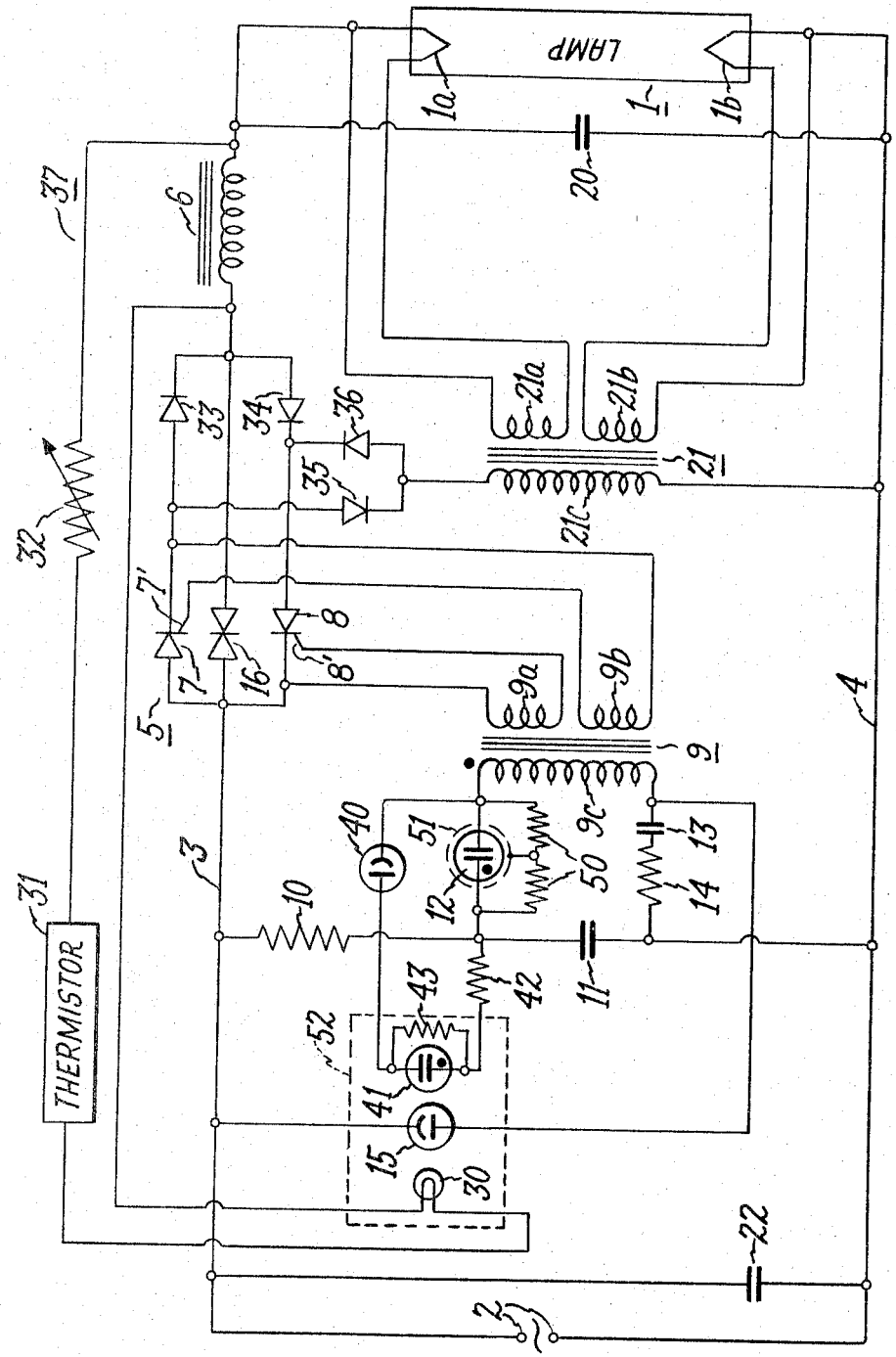

3,317,789
STABILIZED CONTROL CIRCUIT
Joe A. Nuckolls, Hendersonville, N.C., assignor to General Electric Company, a corporation of New York
Filed Apr. 28, 1965, Ser. No. 451,508
14 Claims. (Cl. 315—194)

This application is a continuation-in-part application of co-pending application Ser. No. 223,480 filed Sept. 13, 1962, now U.S. Patent 3,249,807 dated May 3, 1966 and assigned to the same assignee as the present application.

The present invention relates to stabilized control circuits for operating load devices, and more particularly concerns such circuits which employ controlled rectifier switching devices and which stabilize the operation of a load while compensating for ambient conditions.

The invention is particularly applicable to fluorescent lamps of thermionic cathode, low pressure gas discharge type. Such lamps are highly sensitive to ambient temperature conditions. For example, at low temperatures the gas in the lamp tends to condense, and accordingly the light output of the lamp is reduced with a drop in temperature. Other operational conditions may also affect the level of current applied to the fluorescent lamp and hence result in variation of the light produced by the lamp.

It is an object of the invention to provide an improved control circuit of the above type which starts, operates, stabilizes and regulates the operation of load devices, particularly fluorescent gas discharge lamps, even under varying ambient conditions.

It is a particular object of the invention to provide a control circuit of the above type which compensates for ambient temperature conditions, which stabilizes the wattage applied to the load, and which operates to turn the load off and on in response to change in ambient light conditions.

It is another object of the invention to provide a control circuit of the above type which is adapted to control the operation of different controlled load systems in the same circuit without interference between such systems.

Other objects and advantages become apparent from the following description and the appended claims.

With the above objects in view, the present invention in one of its aspects relates to a circuit for controlling energization of a load from an alternating current supply comprising, in combination, controlled rectifier means electrically connected between the load and the alternating current supply, the controlled rectifier means being normally non-conductive to block current flow to the load and having electrode control means to render it conductive, actuating means connected to the alternating current supply and to the electrode control means for applying a control signal to the electrode control means at a predetermined time in each alternating current cycle, the actuating means including series connected resistance and capacitance and voltage sensitive symmetrical switch means connected across the capacitance, photosensitive means connected in parallel with the capacitance, impedance means connected between the load and the alternating current supply for limiting the current to the load, and light producing means connected across the impedance means and arranged so that light produced thereby impinges on the photosensitive means, whereby the light from the light producing means varies with current passing through the impedance to the load, and the photosensitive means is responsive to such light variation for controlling the operation of the actuating means.

The invention will be better understood from the following description taken in conjunction with the accompanying drawing, in which:

The single figure is a circuit diagram of an embodiment of the invention for controlling the power to a fluorescent gas discharge lamp.

Referring now to the drawing, there is shown a phase controlled switching circuit for controlling the current and voltage applied to a load, specifically a fluorescent gas discharge lamp 1, connected to terminals 2 of a source of alternating current by conductors 3 and 4. Ballast inductive reactance 6 is connected in series with lamp 1 to provide current limiting impedance, as conventional in fluorescent lamp circuits. Arranged in series with lamp 1 is a controlled rectifier circuit 5 which includes a paralleled pair of oppositely poled controlled rectifiers 7 and 8, which are typically silicon controlled rectifiers (SCR), having control (or gate) electrodes 7' and 8' by means of which the SCR's are rendered conductive for unidirectional flow of current when a signal impulse is applied to the respective control electrodes.

Control electrodes 7 and 8 are connected to secondary windings 9a, 9b of coupling transformer 9. Transformer 9, which serves to isolate the controlled rectifier circuit 5 from the impulse signal generating circuit, described below, is a pulse transformer which responds only to high frequency pulses and therefore only a single high frequency pulse is applied to the controlled rectifier circuit. This protects the control electrode from any follow-through current from the alternating current supply 2 appearing in the signal generating circuit which could otherwise tend to cause overheating and early failure of the controlled rectifier circuit.

The signal generating circuit comprises a resistance 10 in series with a charging capacitor 11 connected to conductors 3 and 4 directly across terminals 2, thereby synchronizing the signal generating function with the source voltage. A discharge loop for discharging capacitor 11 includes transformer primary 9c and a voltage sensitive device 12, typically a neon glow lamp, which is a bilaterally conducting diode and is also referred to herein as a voltage sensitive symmetrical switch means, which becomes conductive only upon the application of a predetermined voltage thereto. Glow lamp 12 is connected to the source in parallel with capacitor 11 but is effectively connected in series discharge relation thereto, as shown, with transformer primary 9c. A second charging capacitor 13 and current limiting resistor 14 are connected in series with the primary winding 9c in the discharge loop circuit. A photosensitive feedback circuit including photoconductor 15 is connected in series with charging capacitor 13 as shown.

In the above described circuit arrangement, on each half cycle of the alternating current input, one of the controlled rectifiers 7 and 8 will have a positive anode and the other a positive cathode. Therefore, a control signal applied to control electrodes 7' and 8' will place only one of the controlled rectifiers in a conduction mode on each half cycle. A delay in the point in the alternating current input cycle at which the control signal impulse is applied to render the rectifier conductive is known as phase control.

As more fully described in the aforementioned co-pending application, the disclosure of which is incorporated herein by reference, when glow lamp 12 becomes conductive as a result of voltage build-up on capacitor 11, capacitor 11 partially discharges and a signal pulse is applied to the transformer primary 9c which induces a current pulse, of a particular duration and at a particular time in the half-cycle. The controlled rectifier 7 or 8 which has an anode positive with respect to its cathode will then be triggered into conduction by the pulse current applied to control electrodes 7', 8' and the voltage which has built up across the rectifier falls substantially to zero. The controlled rectifier 7 or 8 then permits current to flow building up the voltage, and consequently the power, applied to the load, until the source voltage again falls to zero at half cycle. On the next half-cycle as the anode voltage becomes negative, that controlled rectifier 7 or 8 which was conductive becomes non-conductive and no power is transferred to the load until the signal generating circuit fires the other controlled rectifier.

The time in the half-cycle at which the rectifier is gated is adjustable by the level of resistance 10, or by dissipating the charge on capacitor 13 depending on the resistance of photoconductor 15, as explained in the aforementioned co-pending application. Thus, as photoconductor 15 increases in resistance in response to a decrease in light, the charging rate of capacitor 13 through photoconductor 15 is lowered and the firing angle of the SCR is advanced, thus delivering more power to the load. As the resistance of the photoconductor 15 decreases in response to an increase in light impinging thereon, less power will be delivered to the load since the firing angle of the controlled rectifier circuit 15 is delayed.

For the purpose of protecting the rectifier circuit 5 from transient voltages, a thyrector 16 may be connected in parallel with the rectifiers, as shown.

Capacitor 20 connected in parallel with discharge lamp 1 is a voltage ring-up capacitor and provides a maximum load impedance for the controlled rectifier circuit as well as a high voltage for starting the lamp. Power factor improvement is provided in the circuit by capacitor 22 connected across the source terminals 2.

Filament transformer 21 is connected to the line after the switch means constituted by SCR circuit 5. In the embodiment shown, one end of its primary winding 21c is connected to the circuits of both controlled rectifiers 7 and 8, and secondary windings 21a, 21b are connected respectively to filaments 1a, 1b of fluorescent lamp 1. With this arrangement, the operation of filament transformer 21 is controlled by the operation of the controlled rectifier circuit 5, as more fully described hereinafter.

In accordance with a feature of the invention, each SCR 7 and 8 is provided with a series diode 33 and 34 respectively which isolate the SCR's from the load. Such isolation provides a parallel alternating current path with the lamp load that is subject to switching by the controlled rectifier circuit 5 but across which the high open circuit voltage produced by inductance 6 and capacitor 20 does not appear. In addition, the primary of filament transformer 21 is isolated from the load by diode 35 connected at a point between SCR 7 and diode 33, and by diode 36 connected at a point between SCR 8 and diode 34. As a result of this arrangement, the current passing through SCR 7 upon the latter being fired passes to the series-connected reactor 6 and capacitor 20 through diode 33, and concurrently current is supplied through diode 35 to the primary of filament transformer 21, thereby providing power to the filaments of fluorescent lamp 1 that is regulated and switched by action of the SCR firing angle. The parallel branch consisting of diode 33, reactor 6 and capacitor 20 conducts during this period allowing a high open circuit voltage to be placed across lamp 1 shunting capacitor 20. Although the high open circuit voltage of this resonant circuit is much greater than the input voltage, this high voltage is not reflected back into either the gated SCR 7 or the primary of the filament transformer 21 since it is blocked by diode 33 and diode 36. On the next half-cycle, SCR 8 is fired and the high voltage appearing across capacitor 20 reverses as does the applied voltage across filament transformer 21, and this reverse voltage is blocked by diodes 34 and 35. As a result, the network of diodes described prevents discharge of capacitor 20 through filament transformer 21 and assures its discharge only through lamp 1 for starting the latter. As the lamp ignites and receives power, the high voltage ceases due to the circuit loading by fluorescent lamp 1. The lamp load action, however, does not affect the filament load, and thus the function of lamp 1 is voltage isolated or decoupled from the function of filament transformer 21. As a result of the arrangement, shown, when the lamp power is raised by phase control of the SCR's as described, the filament current is also raised providing greater thermionic emission to enhance the operation of lamp 1.

In accordance with another feature of the present invention, the above circuit incorporates a feedback circuit whereby the operation of the fluorescent lamp at low temperatures is improved. In the embodiment shown, the feedback circuit 37 includes an incandescent lamp 30, a thermistor 31 and a variable resistance 32, the feedback circuit being connected across ballast reactor 6. Incandescent lamp 30 is arranged so that light produced thereby impinges on photoconductor 15. The operation of the feedback circuit is such that the voltage developed across ballast reactor 6 as a function of the lamp current provides lamp power regulation compensating for variations in the line voltage. Thus, in the event current to the fluorescent lamp 1 drops, incandescent lamp 30 becomes dimmer, with the result that the resistance of photoconductor 15 increases and consequently the charge rate of capacitor 13 through photoconductor 15 is lowered, and the firing angle of the controlled rectifier circuit 5 is advanced delivering more power to the lamp 1 and thus maintaining its illuminating level. As the resistance of photoconductor 15 decreases in response to an increase in light from incandescent lamp 30, less power will be delivered to the lamp 1 since the firing angle of the controlled rectifier circuit is delayed. Thus, the power to the load is maintained constant, and a constant light output may be achieved.

Similarly, a constant light output is obtained by operation of thermistor 31. As the ambient temperature drops, thermistor 31 senses such drop and increases its resistance, thereby lowering the feedback current level, dimming incandescent lamp 30, and resulting in an increase in power delivered to the lamp, as described previously. Variable resistor 32 may be adjusted for the purpose of maintaining the current in the feedback loop within the desired regulating range.

Feedback circuit 37 thus provides increased filament power at low temperature, and along with the high open circuit voltage provided by the circuit containing conductance 6 and capacitor 20, this feature effects positive lamp starting even at very low temperatures.

While photoconductor 15 is shown connected to line conductor 3 in series with capacitor 13, it is also contemplated in accordance with the invention that photoconductor 15 may be connected in shunt with capacitor 13 or capacitor 11 to influence the rate of charge thereon, for purposes already mentioned.

In accordance with another feature of the invention, the circuit includes a photosensitive control circuit for automatically switching the fluorescent lamp 1 on and off at a desired ambient light level. For this purpose, there is connected across glow lamp 12 a control circuit comprising photoconductor 40 connected in series with a voltage sensitive symmetrical switch 41, such as a neon glow lamp, and a resistnce 42. Glow lamp 41 is arranged so that light produced thereby impinges upon photoconductor 15. The operation of this photosensitive circuit is such that when photoconductor 40 has low resistance by being exposed to daylight conditions, it serves to shunt the voltage around glow lamp 12 keeping the latter from reaching a breakdown voltage level and conducting, and thus prevents the operation of the triggering or signal generating circuit of which glow lamp 12 forms a part. By passage of voltage through the photoelectric circuit, glow lamp 41 glows, since it has a lower breakdown level than glow lamp 12, and by virtue of the light from glow lamp 41 impinging on photoconductor 15 the photoelectric circuit overrides the action of the feedback circuit 37 containing incandescent lamp 30. Thus, fluorescent lamp 1 is prevented from operating during the daytime even though the feedback circuit 37 including incandescent lamp 30 would otherwise be in condition for increasing power to the fluorescent lamp, as previously described. During the hours of darkness, the resistance of photoconductor 40 increases, thereby permitting operation of the pulse producing glow lamp 12 in normal operation of the circuit.

Resistance 42 in the photoelectric control circuit limits the peak current flowing in the circuit and thereby avoids inadvertent firing of the SCR circuit 5 via glow lamp 41. Resistance 43 is preferably provided across glow lamp 41 to provide a voltage division network to ensure extinguishing of glow lamp 41 until such time as the photoelectric function arises, and it contributes to the snap-action of the photoelectric control function of this circuit.

Preferably, resistance 50 is placed in shunt with glow lamp 12 to ensure symmetry of the breakdown mechanism of the glow lamp, regardless of the instabilities of the cathode drop in the lamp on the previous half-cycle. Shield 51, such as an aluminum foil sleeve, is placed around glow lamp 12 and connected to the mid-point of resistance 50 to provide balanced shielding of the glow lamp from electrostatic fields which might adversely affect its operation, especially when the circuit components are placed in compact arrangement.

In practice, incandescent lamp 30, photoconductor 15 and neon glow lamp 41 are enclosed in a light-tight box or housing 52, shown in broken lines.

The circuit of the invention thus provides automatic compensation for line voltage variations and changes in ambient temperature, snap-action photoelectric control responsive to ambient light conditions, effective fluorescent lamp starting, means to de-energize the lamp filament during daytime, isolation of the filament transformer and switch functions from the lamp load action, and other advantages which are apparent from the foregoing description.

While the invention has been described specifically as applied to a fluorescent lamp and a filament transformer employed in conjunction therewith, it will be understood that the invention is not limited in its application to such devices. For example, other types of loads may be substituted for either or both the fluorescent lamp and filament transformer. Thus, the latter may be replaced by the combination of another ballast transformer and fluorescent lamp in series, or by a motor which is intended to operate concurrently with the described fluorescent lamp.

Accordingly, while the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A circuit for controlling the power applied to load means comprising, in combination, a source of alternating current, load means energized by said alternating current source, controlled rectifier means connected between said alternating current source and said load means, said controlled rectifier means being normally non-conductive to block current flow to the load means and having electrode control means to render it conductive, actuating means connected to said alternating current source and to said electrode control means for applying a control signal to said electrode control means at a predetermined time in each alternating current cycle, said actuating means including a resistance and capacitance connected together in series, and voltage sensitive symmetrical switch means connected across said capacitance, and unidirectional current blocking means connected between said controlled rectifier means and said load means for blocking reverse current from said load means.

2. A circuit for controlling the power applied to load means comprising, in combination, a source of alternating current, first and second load devices energized by said alternating current source, controlled rectifier means connected between said alternating current source and said first and second load devices, said controlled rectifier means being normally non-conductive to block current flow to said load devices and having electrode control means to render it conductive, actuating means connected to said alternating current source and to said electrode control means for applying a control signal to said electrode control means at a predetermined time in each alternating current cycle, and unidirectional current blocking means connected between said controlled rectifier means and said first and second load devices for blocking reverse current from said load devices.

3. A circuit for controlling the power applied to a load energized by a source of alternating current comprising, in combination, controlled rectifier means connected between the load and the alternating current source, said controlled rectifier means being normally non-conductive to block current flow to the load and having electrode control means to render it conductive, actuating means connected to the alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected between the load and the alternating current source for limiting the current to the load, current sensitive means connected across said impedance means for detecting variations in current passing to the load, and means connected to said capacitance and responsive to said current sensitive means for determining the rate of charge on said capacitance and thereby controlling the operation of said actuating means.

4. A circuit for controlling the power applied to a load energized by a source of alternating current comprising, in combination, controlled rectifier means connected between the load and the alternating current source, said controlled rectifier means being normally non-conductive to block current flow to the load and having electrode control means to render it conductive, actuating means connected to the alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected between the load and the alternating current source for limiting the current to the load, current sensitive means connected across said impedance means for detecting variations in current passing to the load, means connected to said capacitance and responsive to said current sensitive means for determining the rate of charge on said capacitance and thereby controlling the operation of said actuating means, and unidirectional current blocking means connected between said controlled rectifier means and said impedance means for blocking reverse current from the circuit including said impedance means and the load.

5. A circuit for controlling the power applied to a load energized by a source of alternating current comprising, in combination, controlled rectifier means connected between the load and the alternating current source, said controlled rectifier means being normally non-conductive to block current flow to the load and having electrode control means to render it conductive, actuating means connected to the alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected between the load and the alternating current source for limiting the current to the load, current sensitive means connected across said impedance means for detecting variations in current passing to the load, temperature sensitive means connected to said current sensitive means for controlling the operation of the latter means in response to ambient temperature conditions, and means connected to said capacitance and responsive to said current sensitive means for determining the rate of charge on said capacitance and thereby controlling the operation of said actuating means.

6. A circuit for controlling the power applied to a load energized by a source of alternating current comprising, in combination, controlled rectifier means connected between the load and the alternating current source, said controlled rectifier means being normally non-conductive to block current flow to the load and having electrode control means to render it conductive, actuating means connected to the alternating current source and to said electrode control means for applying a control signal to said electrode control means at a predetermined time in each alternating current cycle, said actuating means including a resistance and a first capacitance connected together in series, voltage sensitive symmetrical switch means connected across said first capacitance, and a second capacitance and a pulse transformer in series with said switch means, said pulse transformer connected to the electrode control means of said controlled rectifier means for applying a control signal thereto, impedance means connected between the load and the alternating current source for limiting the current to the load, light producing means connected across said impedance means and responsive in light output to variations in current passing to the load through said impedance means, and photosensitive means in series relation to said second capacitance and responsive to said light producing means for determining the rate of charge of said second capacitance and thereby controlling the operation of said actuating means.

7. A circuit for controlling the power applied to a discharge lamp energized by a source of alternating current comprising, in combination, controlled rectifier means connected between the lamp and the alternating current source, said controlled rectifier means being normally non-conductive to block current flow to said discharge lamp and having electrode control means to render it conductive, actuating means connected to said alternating current source and to said electrode control means for applying a control signal to said electrode control means at a predetermined time in each alternating current cycle, a current limiting impedance connected between said controlled rectifier means and said discharge lamp, a capacitor connected across said discharge lamp and in series with said current limiting impedance to form a resonant circuit therewith, and diode means connected between said controlled rectifier means and said current limiting impedance for blocking reverse current from said resonant circuit.

8. A circuit for controlling the power applied to a discharge lamp having filament electrodes and energized by a source of alternating current comprising, in combination, controlled rectifier means connected between said discharge lamp and said alternating current source, said controlled rectifier means being normally non-conductive to block current flow to said discharge lamp and having electrode control means to render it conductive, actuating means connected to said alternating current source and to said electrode control means for applying a control signal to said electrode control means at a predetermined time in each alternating current cycle, a current limiting impedance connected between said controlled rectifier means and said discharge lamp, a capacitor connected across said discharge lamp and in series with said current limiting impedance to form a resonant circuit therewith, a filament transformer having a primary connected to said controlled rectifier means for control thereby and having a secondary connected to the filament electrodes of said discharge lamp, and diode means connected between said controlled rectifier means and each of said resonant circuit and the primary of said filament transformer for blocking reverse current from said resonant circuit to said controlled rectifier means and the primary of said filament transformer.

9. A circuit for controlling the power applied to a load energized by a source of alternating current comprising, in combination, controlled rectifier means connected between the load and the alternating current source, said controlled rectifier means being normally non-conductive to block current flow to the load and having electrode control means to render it conductive, actuating means connected to the alternating current source and to said electrode control means for applying a control signal to said electrode control means at a predetermined time in each alternating current cycle, said actuating means including a resistance and a first capacitance connected together in series, voltage sensitive symmetrical switch means connected across said first capacitance, and a second capacitance and a pulse transformer in series with said switch means, impedance means connected between the load and the alternating current source for limiting the current to the load, light producing means connected across said impedance means and responsive in light output to variations in current passing to the load through said impedance means, photosensitive means in series relation to said second capacitance and responsive to said light producing means for determining the rate of charge of said second capacitance and thereby controlling the operation of said actuating means, and a photoelectric control circuit connected in shunt relation to said voltage sensitive symmetrical switch means and responsive to ambient light conditions for overriding control of the operation of said actuating means.

10. A circuit for controlling the power applied to a load energized by a source of alternating current comprising, in combination, controlled rectifier means connected between the load and the alternating current source, said controlled rectifier means being normally non-conductive to block current flow to the load and having electrode control means to render it conductive, actuating means connected to the alternating current source and to said electrode control means for applying a control signal to said electrode control means at a predetermined time in each alternating current cycle, said actuating means including a resistance and a first capacitance connected together in series, voltage sensitive symmetrical switch means having a predetermined voltage breakdown level connected across said first capacitance, and a second capacitance and a pulse transformer in series with said switch means, impedance means connected between the load and the alternating current source for limiting the current to the load, light producing means connected across said impedance means and responsive in light output to variations in current passing to the load through said impedance means, first photosensitive means in series relation to said second capacitance and responsive to said light producing means for determining the rate of charge of said second capacitance and thereby controlling the operation of said actuating means, and a photoelectric control circuit connected in shunt relation to said voltage sensitive symmetrical switch means and responsive to ambient light conditions for overriding control of the operation of said actuating means, said photoelectric control circuit including a second photosensitive means connected in series with a glow lamp operating at a lower voltage than said voltage sensitive symmetrical switch means and arranged adjacent said first photosensitive means for controlling the operation thereof, whereby the operation of the load is turned off and on in response to ambient light conditions.

11. A circuit for controlling the power applied to a discharge lamp energized by a source of alternating current and having filament electrodes comprising, in combination, controlled rectifier means connected in series with the discharge lamp across the alternating current source, said controlled rectifier means having control electrode means and blocking current flow through the discharge lamp until a signal pulse is applied to its control electrode means rendering said controlled rectifier means conductive, actuating means for applying a control signal to said control electrode means including a resistance and a first capacitance connected in series to the alternating current source, voltage sensitive symmetrical switch means which becomes conductive at a predetermined voltage level connected in series with said resistance and parallel to said first capacitance, a pulse transformer and a second capacitance, said first and second capacitance, said voltage sensitive symmetrical switch means and the primary of said pulse transformer forming a discharge loop, said control electrode means being connected to the secondary of said pulse transformer, a filament transformer having a primary connected to said controlled rectifier means for control thereby and having a secondary connected to the filament electrodes of the discharge lamp, resonant circuit means including a capacitor connected across said discharge lamp, and diode means connected between said controlled rectifier means and each of said resonant circuit means and said filament transformer for blocking reverse current to said controlled rectifier means and said filament transformer from said resonant circuit means.

12. A circuit for controlling the power applied to a discharge lamp energized by a source of alternating current comprising, in combination, controlled rectifier means connected between the lamp and the alternating current source, said controlled rectifier means being normally non-conductive to block current flow to said discharge lamp and having electrode control means to render it conductive, actuating means connected to said alternating current source and to said electrode control means for applying a control signal to said electrode control means at a predetermined time in each alternating current cycle, a current limiting impedance connected between said controlled rectifier means and said discharge lamp, a capacitor connected across said discharge lamp and in series with said current limiting impedance to form a resonant circuit therewith, diode means connected between said controlled rectifier means and said current limiting impedance for blocking reverse current to said controlled rectifier means from said resonant circuit, light producing means connected across said current limiting impedance and responsive in light output to variations in current passing to the discharge lamp through said current limiting impedance, and photosensitive means connected to said actuating means and responsive to said light producing means for controlling the operation of said actuating means.

13. A circuit as defined in claim 12, wherein temperature sensitive means are connected to said light producing means for controlling the operation of the latter in response to ambient temperature conditions, and thereby controlling the operation of said actuating means.

14. A circuit for controlling the power applied to a discharge lamp energized by a source of alternating current comprising, in combination, controlled rectifier means connected between the lamp and the alternating current source, said controlled rectifier means being normally non-conductive to block current flow to said discharge lamp and having electrode control means to render it conductive, actuating means connected to said alternating current source and to said electrode control means for applying a control signal to said electrode control means at a predetermined time in each alternating current cycle, a current limiting impedance connected between said controlled rectifier means and said discharge lamp, a capacitor connected across said discharge lamp and in series with said current limiting impedance to form a resonant circuit therewith, diode means connected between said controlled rectifier means and said current limiting impedance for blocking reverse current to said controlled rectifier means from said resonant circuit, light producing means connected across said current limiting impedance and responsive in light output to variations in current passing to the discharge lamp through said current limiting impedance, first photosensitive means connected to said actuating means and responsive to said light producing means for controlling the operation of said actuating means, and a photoelectric control circuit connected to said actuating means and responsive to ambient light conditions for overriding control of the operation of said actuating means, said photoelectric control circuit including a second photosensitive means connected in series with a glow lamp, arranged adjacent said first photosensitive means for controlling the operation thereof, whereby the operation of the discharge lamp is turned off and on in response to ambient light conditions.

References Cited by the Examiner
UNITED STATES PATENTS

| | | | |
|---|---|---|---|
| 3,157,821 | 11/1964 | Passmore et al. | 313—158 X |
| 3,176,189 | 3/1965 | Tabet | 315—159 X |
| 3,193,725 | 7/1965 | Skirpan | 315—194 |
| 3,205,404 | 9/1965 | Kurata et al. | 315—199 X |

JOHN W. HUCKERT, *Primary Examiner.*

R. R. POLISSACK, *Assistant Examiner.*